May 20, 1930.  C. MOSEL  1,759,320

CHICKEN FEEDER

Filed June 7, 1929

Charles Mosel, Inventor

By C.A.Snow & Co.

Attorneys.

Patented May 20, 1930

1,759,320

UNITED STATES PATENT OFFICE

CHARLES MOSEL, OF KERRVILLE, TEXAS

CHICKEN FEEDER

Application filed June 7, 1929. Serial No. 369,143.

This invention relates to a feeder whereby either wet mash or dry feed can be fed to chickens, one of the objects being to provide a simple, inexpensive and efficient device of this character the contents of which will be protected from rain.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
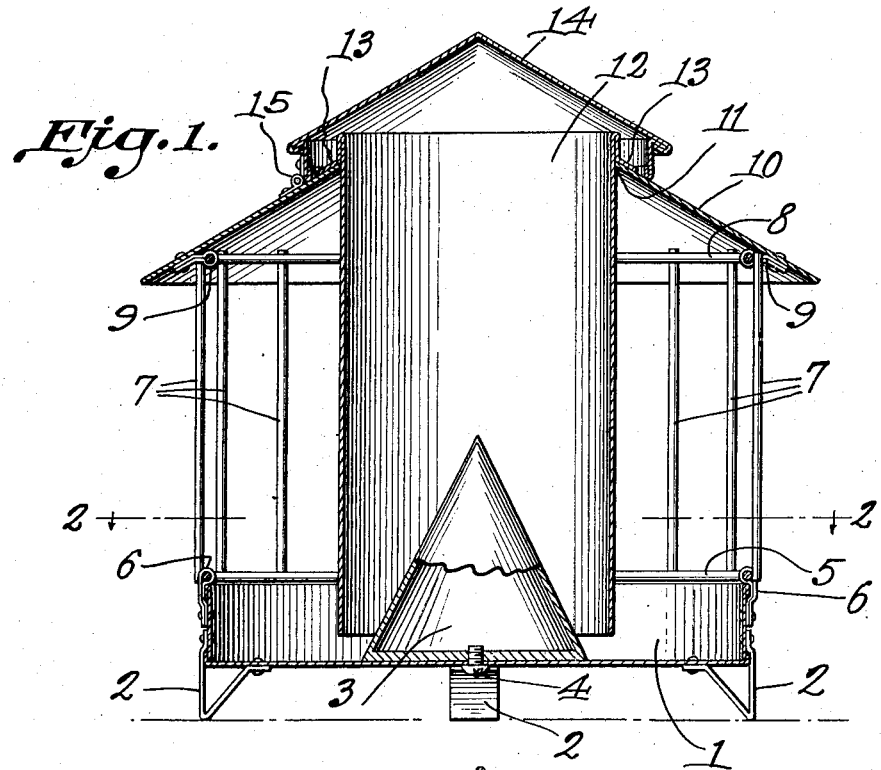
Figure 1 is a central vertical section through the device, the spreader being shown partly in elevation.
Figure 2:
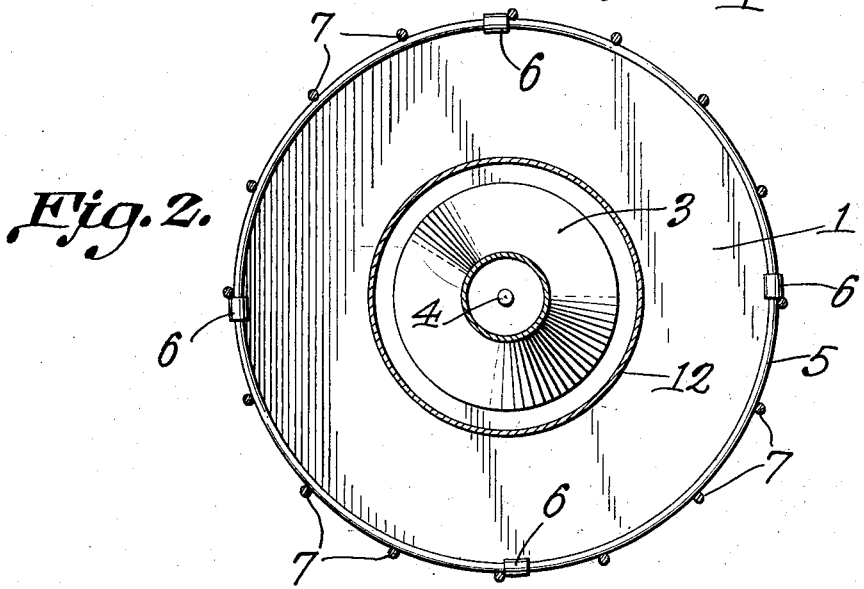
Figure 2 is a section on line 2—2, Figure 1.

Referring to the figures by characters of reference, 1 designates a base in the form of a circular tray having supporting members or legs 2 riveted or otherwise fastened thereto so that they will be held at the proper height. Detachably mounted on the central portion of the tray is a spreading cone 3 held in place by a screw 4 or any suitable fastening element which, when removed, will allow the spreading cone to be also removed.

A ring 5 of stiff wire or the like is held close to the top of the wall of the tray by loops 6 that extend therearound and are riveted or otherwise fastened to said wall. Extending from this ring are stiff wires 7 that support an upper ring 8 secured by loops 9 to the inner surface of a frusto-conical top 10 the margin of which extends a sufficient distance outwardly beyond the wires 7 and tray 1 to serve as a means for preventing rain from entering the tray to an objectionable extent.

The cover 10 has a central opening 11 in which is seated the upper portion of a cylindrical container 12 that is suspended from the cover and extends close to the bottom of the tray. The bottom of this container is open and concentric with the spreading cone 3. While this container 12 can be soldered or otherwise connected to the cover 10 it is preferred to suspend it detachably therefrom. This can be done by forming the upper portion of the container with an annular flange 13 adapted to rest on the cover.

A lid, preferably conical as shown at 14, is hingedly connected to the cover 10 as at 15 and is adapted normally to rest on the cover so as thus to close the the upper end of the container 12.

When it is desired to use the device for holding dry feed the cover 14 is raised and the feed is placed in the container 12. The lid 14 is then lowered and obviously the conical spreader will direct the feed radially within the tray 1 toward the wall thereof. This will enable small-sized poultry to reach the feed.

If wet mash is to be employed, the conical spreader 3 is removed and the container 12 is also removed and the mash placed on the tray.

It will be seen that this device is very simple and compact in construction and the parts thereof can be assembled readily.

What is claimed is:

1. A feeder of the class described including a tray, a frusto-conical cover, upper and lower rings secured to the cover and tray respectively, spaced members connecting the rings and supporting the cover above the tray, and a lid hingedly mounted on the cover, said cover having a central opening normally closed by the lid.

2. A feeder of the class described including a tray, a frusto-conical cover, upper and lower rings secured to the cover and tray respectively, spaced members connecting the rings and supporting the cover above the tray, and a lid hingedly mounted on the cover, said cover having a central opening normally closed by the lid, a conical spreader detachably secured to the tray beneath the opening in the cover, and a container suspended from the cover and extending around the spreader and close to the bottom of the tray.

3. A feeder of the class described including a tray, a frusto-conical cover, upper and lower rings secured to the cover and tray respectively, spaced members connecting the rings and supporting the cover above the tray, a lid hingedly mounted on the cover, said cover having a central opening normally closed by the lid, a conical spreader detachably secured to the tray beneath the opening in the cover, and a container suspended from the cover and extending around the spreader and close to the bottom of the tray, said container being removable upwardly from the opening in the cover.

In testimony that I claim the foregoing as my own, I have hereto affixed my signature.

CHARLES MOSEL.